US007248270B1

(12) United States Patent
Boylan

(10) Patent No.: US 7,248,270 B1
(45) Date of Patent: Jul. 24, 2007

(54) STROKE-BASED POSING OF THREE-DIMENSIONAL MODELS

(75) Inventor: Terran Boylan, Redwood City, CA (US)

(73) Assignee: Pacific Data Images LLC, Redwood City, CA (US)

( * ) Notice: Subject to any disclaimer, the term of this patent is extended or adjusted under 35 U.S.C. 154(b) by 453 days.

(21) Appl. No.: 10/861,222

(22) Filed: Jun. 4, 2004

Related U.S. Application Data

(60) Provisional application No. 60/538,494, filed on Jan. 22, 2004.

(51) Int. Cl.
*G09G 5/00* (2006.01)
(52) U.S. Cl. .................... 345/679; 345/653; 715/861; 715/863
(58) Field of Classification Search .................. None
See application file for complete search history.

(56) References Cited

U.S. PATENT DOCUMENTS

| | | | | |
|---|---|---|---|---|
| 5,237,647 | A * | 8/1993 | Roberts et al. ............. | 345/419 |
| 6,054,999 | A * | 4/2000 | Strandberg .................. | 345/474 |
| 6,320,988 | B1 * | 11/2001 | Yamaguchi et al. ........ | 382/276 |
| 6,326,972 | B1 * | 12/2001 | Buhler et al. ............... | 345/474 |
| 6,738,065 | B1 * | 5/2004 | Even-Zohar ................ | 345/473 |
| 6,985,145 | B2 * | 1/2006 | Knighton et al. ........... | 345/428 |
| 7,116,330 | B2 * | 10/2006 | Marshall et al. ............ | 345/474 |
| 2004/0196301 | A1 * | 10/2004 | Isner .......................... | 345/653 |
| 2006/0061574 | A1 * | 3/2006 | Ng-Thow-Hing et al. .. | 345/473 |

OTHER PUBLICATIONS

Author: Dean Rubine, Title: "Specifying Gestures by Example", Date: Jul. 1991, Publisher: Carnegie Mellon University, vol. 25, pp. 329-337.*
Author: Andrew Clayton, Title: "3D Studio Max Applied", Date: 1996, Publisher: Advantstar Communications, Inc., pp. 399-406.*
Davis, James, et. al., "A Sketching Interface for Articulated Figure Animation," Eurographics/SIGGRAPH Symposium of Computer Animation (2003), 10 pages.
Hecker, Ronie et al., "Controlling 3D Objects by Sketching 2D Views," Sensor Fusion V, Proceedings SPIE—International Society for Optical Engineering, Nov. 1992, pp. 46-48, vol. 1828, Boston, Massachusetts.
Rubine, D. "Specifying Gestures by Example," Computer Graphics, Jul. 1991, pp. 329-337, vol. 25, Information Technology Center, Carnegie Mellon University, Pittsburgh, PA.

* cited by examiner

*Primary Examiner*—Mark Zimmerman
*Assistant Examiner*—David Chu
(74) *Attorney, Agent, or Firm*—Morrison & Foerster LLP

(57) ABSTRACT

A posing system for three-dimensional characters and other models uses a stroke-based gestural language to position elements of the characters in a three-dimensional environment. A user draws a stroke in a two-dimensional interface in connection with a portion of model. The drawn stroke corresponds to an element of the model, such as a particular body part. A software program interprets the stroke and applies it to the placement or posing of the corresponding element. Additional elements are posed as necessary to further define the way in which the model as a whole should be posed. With a number of appropriate strokes for each of the elements, an animator can position the model in the scene.

16 Claims, 4 Drawing Sheets

FIG. 16

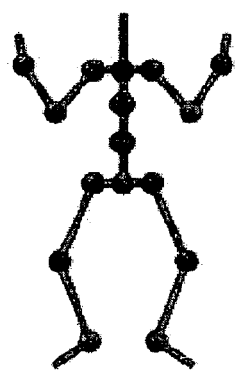
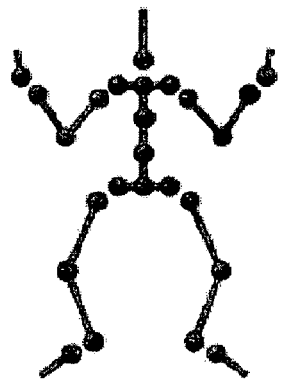
FIG. 1A  FIG. 1B
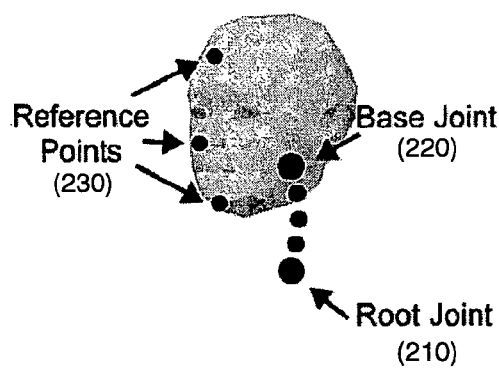
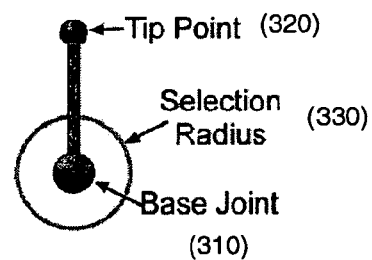
FIG. 2  FIG. 3
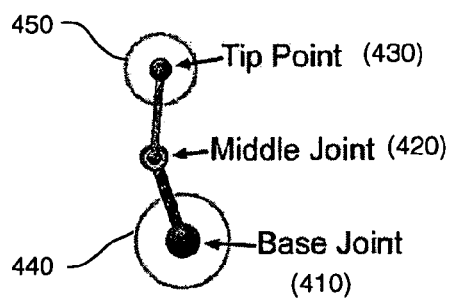
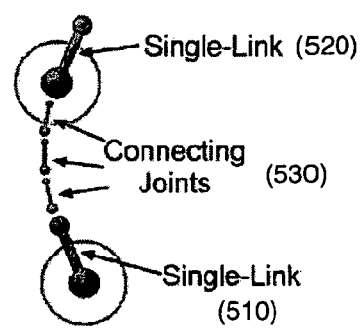
FIG. 4  FIG. 5

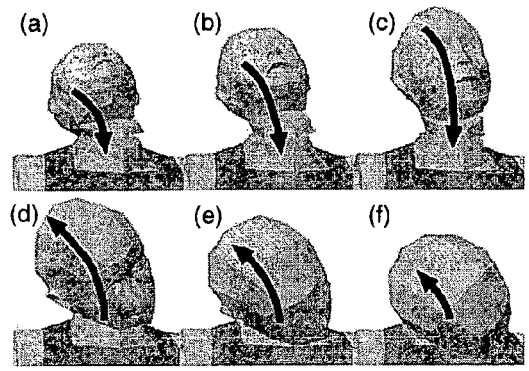
FIG. 14
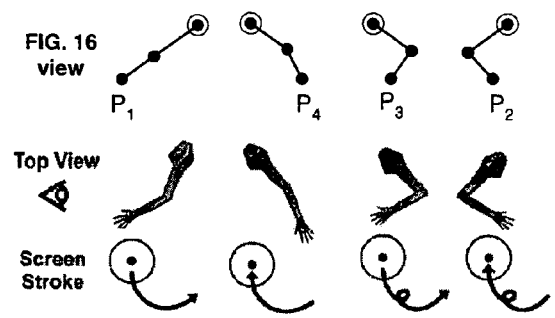
FIG. 17
| Stroke | ↶ | ↶ | ↓ | ↷ | ↷ | ↶ | ↶ | ↓ | ↷ | ↷ |
|---|---|---|---|---|---|---|---|---|---|---|
| Rotation (degrees) | | -90 | -45 | 0 | 45 | 90 | -90 | -45 | 0 | 45 | 90 |
| Facing (relative to camera) | | front | front | front | front | front | rear | rear | rear | rear | rear |
| Axial View (arrow indicating front facing direction of element) | | ⊙→ | ⊙↘ | ⊙↓ | ⊙↙ | ⊙← | ⊙→ | ⊙↗ | ⊙↑ | ⊙↖ | ⊙← |
FIG. 15
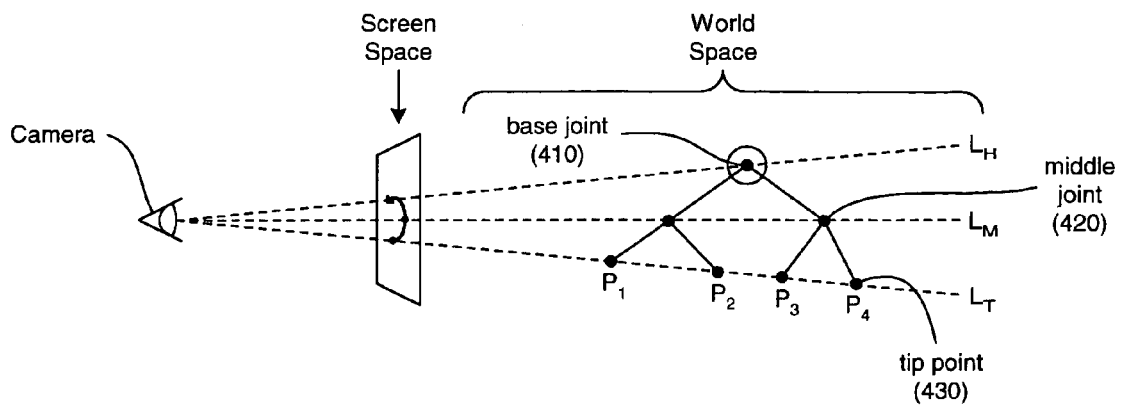
FIG. 16

STROKE-BASED POSING OF THREE-DIMENSIONAL MODELS

CROSS REFERENCE TO RELATED APPLICATIONS

This application claims the benefit of U.S. Provisional Application No. 60/538,494, filed Jan. 22, 2004, which is incorporated by reference in its entirety.

BACKGROUND

1. Field of the Invention

This invention relates generally to computer animation of three-dimensional scenes, and in particular to systems and methods for posing three-dimensional animated characters and/or other three-dimensional animated models that can be posed.

2. Background of the Invention

During the computer animation process, an animator often must pose one or more characters in a three-dimensional environment to create a scene. The current state of the art in posing three-dimensional characters usually involves a WIMP (windows, icons, menus, and pointers) interface combined with direct manipulation techniques. Direct manipulation techniques include a virtual trackball, described in Chen et al., "A Study in Interactive 3-D Rotation Using 2-D Control Devices," *SIGGRAPH* 1988 *Proceedings, p.* 121-29; inverse kinematics, described in Girard et al., "Computational Modeling for the Computer Animation of Legged Figures," *SIGGRAPH '85 Proceedings, p.* 263-70; and three-dimensional widgets, described in Snibbe et al., "Using Deformations to Explore 3D Widget Design," *SIGGRAPH* 1992 *Proceedings*. The challenge for each of these techniques is to pose three-dimensional objects using a two-dimensional interface.

Existing methods may be satisfactory for artists highly familiar with computers and three-dimensional animation tools, but they can be quite daunting to two-dimensional artists unfamiliar with the three-dimensional medium. In the two-dimensional medium, artists typically sketch their drawings on paper. Regardless of their medium of choice, many animators use gesture drawings or small "thumbnail sketches" to work out their poses before embarking on the more laborious task of drawing the entire character in detail. A gesture drawing is a quick sketch—usually made in a few seconds—that conveys the attitude or essence of a pose without necessarily depicting the subject precisely. Beneficially, a gesture drawing reduces a complex subject to simple shapes that are easy to draw.

As the animation industry expands from traditional hand-drawn methods into digital production and three-dimensional animation, there is a need to retrain talented two-dimensional animators to work in this new medium. Currently, to make this transition, artists must first master an unfamiliar three-dimensional interface paradigm. It would be better if instead artists were given an interface that builds on the drawing skills they already have. Even for artists already familiar with three-dimensional animation, such an interface might prove a natural and comfortable alternative or supplement to existing methods.

SUMMARY OF THE INVENTION

Accordingly, a posing system for three-dimensional characters and other posable models uses a gestural language that is easy to learn and intuitive for artists but still able to pose objects in a three-dimensional animation environment. Using traditional drawing techniques, an animator can pose a character in a three-dimensional environment by simply drawing strokes onto a two-dimensional drawing interface. Specifically, a user draws a stroke on the interface in connection with a portion of a non-posed or partially-posed character. Each stroke corresponds to an element of the character, such as a particular body part, and indicates the artist's desired orientation for that element. A software program interprets a drawn stroke and applies it to the placement or posing of the corresponding element. The interpretation includes mapping the stroke, which is has a two-dimensional representation, into its effect on the element in the three-dimensional coordinate system of the character. Additional elements are posed as necessary to define further the way in which the character as a whole should be posed. With a number of appropriate strokes for each of the elements, an animator can quickly and intuitively position the character in the scene.

The invention thus allows a user to pose or modify an existing pose of an animated three-dimensional model by drawing a number of two-dimensional strokes directly over the model. To the user, this approach feels like familiar gesture drawing techniques commonly used by artists. Two-dimensional to three-dimensional ambiguities (e.g., whether an element of a character is facing towards or away from the camera) are resolved via an intuitive set of conventions that are consistently used. For example, one convention may be that the direction of a drawn stroke in two-dimensional screen space always indicates a direction in three-dimensional world space towards the camera. Embodiments of the invention include tools for (a) placing entire models; (b) posing arms, legs, heads, hands, feet, spines, and other elements of the character; and/or (c) choosing facial and hand expressions from a pre-defined library.

In one embodiment, after locating the coordinate positions for an element in three-dimensional space given a stroke, the posing system further resolves the angular position of the element. The angular position of the element is the amount that the element is rotated about its major axis from a given front facing reference point. The posing system may resolve the angular position of an element using one or more of: the curvature of the stroke, the direction of the curvature of the stroke, and whether the stroke self-intersects. In one embodiment, for example, the curvature of the stroke (e.g., using the radius of curvature, or the ratio of the length and width of the stroke) is used to determine a rotation of up to a quarter turn from either a front or rear facing orientation. The direction of the up to one quarter turn is indicated by the direction of the curvature, such as on which side the curvature lies relative to the head/tail line segment of the stroke in screen space. Lastly, whether the turn is from a front or rear-facing orientation is determined according to whether the stroke self intersects. In this way, the posing system allows for posing an element in any angular position relative to its major axis.

BRIEF DESCRIPTION OF THE DRAWINGS

FIGS. 1A and B are normal and exploded views of an example skeleton for a character to be posed in accordance with an embodiment of the invention.

FIG. 2 illustrates a placement module in accordance with an embodiment of the invention.

FIG. 3 illustrates a single-link module in accordance with an embodiment of the invention.

FIG. 4 illustrates a double-link module in accordance with an embodiment of the invention.

FIG. 5 illustrates a spine module in accordance with an embodiment of the invention.

FIG. 14 shows several examples of the tilted orientation produced with various strokes for an example single-link module.

FIG. 15 includes a table that shows how the curvature and self-intersection of various strokes can be used to represent different amounts of axial rotation to determine the axial rotation position for a single-link element.

FIG. 16 illustrates the relationship between screen space and world space for posing a double-link module, in accordance with an embodiment of the invention.

FIG. 17 illustrates four different orientations for a double-link module and an example stroke for posing each, in accordance with an embodiment of the invention.

DETAILED DESCRIPTION OF THE PREFERRED EMBODIMENTS

Figure 6:
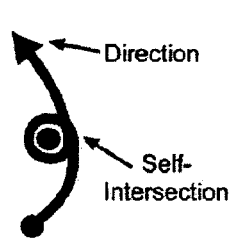
FIG. 6 illustrates a symbol recognition module in accordance with an embodiment of the invention.

The invention provides computer-implemented methods and systems for posing three-dimensional animated characters in a computer graphics animation environment. As used herein, a character can be any type of three-dimensional model in a scene that includes posable elements. A typical application for the invention is the posing of a character in a scene of an animation; however, the character need not be limited to any particular form or type, and it can be any type of humanoid, animal, or any other object that can be posed in a scene.

The Skeleton

A character comprises a skeleton, which includes a hierarchical collection of elements that make up the skeleton. FIG. 1A shows an example skeleton for a humanoid type character, and FIG. 1B shows an exploded view of the same skeleton to show the individual elements that compose the skeleton. The skeleton includes an element each for the neck and head, torso, each arm, each hand, each leg, and each foot. Each of these elements of the skeleton includes one or more segments and one or more joints. Pairs of segments are connected by a joint, which allows connected segments to rotate relative to each other.

As the exploded view of FIG. 1B shows, elements of the skeleton may share joints. This may give rise to the hierarchical relationship among the elements of the skeleton. A hierarchical relationship between two elements can be created by defining one element to have a shared joint with another element. For example, a hand element of a skeleton shares its wrist joint with an arm element, which in turn shares its shoulder joint with the torso element. The skeleton is hierarchical because changes to the position of some elements can affect the position other elements. Specifically, a subservient element in the hierarchy will be repositioned if it shares a node with another element that has been repositioned. For example, when an arm element is adjusted, or posed, the corresponding hand element will be moved according to the movement of the wrist. In one embodiment, this movement may be a simple translation of the hand so that the hand remains attached to the arm at the wrist joint. In other embodiments, the movement may cause a reorientation of the hand as well. It can be appreciated that this hierarchical relationship preserves the integrity of the skeleton.

Each element of the skeleton can be one of a number of predefined types. In one embodiment of the invention, an element can be any one of the following:

placement module
single-link module
double-link module
spine module
symbol recognition module As explained below, each element responds to posing commands depending on which type of module it is. Each of these types of elements will be introduced first, and then their interaction in the posing system will be explained.

A placement module for an example character is shown in FIG. 2. In an embodiment of the invention, each character has a placement module. The placement module for a character allows the character to be initially placed in the scene. A placement module consists of a root joint 210, a base joint 220, and three non-collinear feature reference points 230. The base joint 220 and root joint 210 are related by the simplified joint hierarchy of the skeleton, which includes the set of joints and segments for the character. The root joint 210 is the top level node of the joint hierarchy for the character and is therefore a parent of the base joint 220 (but not generally its direct parent). The three feature reference points 230 define a feature arc of the character, which is preferably associated with a prominent character feature. For example, the feature arc used in the placement modules of FIG. 2 is defined by the top of the head to the nose to the chin. In this way, the feature reference points 230 can be used to position the character by positioning a prominent feature of the character.

In another embodiment, a character may have multiple placement modules for placing the character in the scene. Multiple placement modules for a character allow an artist different options for placing a character in a scene. In some situations, for example, it may make sense to use the arc of a character's face to place the character in the scene, while in other situations, it may make more sense to use a stroke that represents the height and orientation of the entire body. If a character has multiple placement modules, the artist will select from among them, and then draw a stroke to place the character based on the selected placement module.

FIG. 3 illustrates a single-link module, which can be used to represent heads, hands, and feet, as well as chests and hips. A single-link module includes a base joint 310 with three degrees of rotational freedom, a tip point 320, and a selection radius 330. The vector between the base joint 310 and the tip point 320 defines the major axis of the single-link module, and the distance between the base joint 310 and the tip point 320 is the segment length. The base joint 310 of the single-link module is also known as its selection node, as it is the node of this module that is used to select this element for posing. Selecting an element for posing is performed by drawing a stroke that begins or ends at a selection node— here, the base joint 310—within the tolerance defined by the selection radius 330 associated with the selection node. Selection and posing of elements is described in more detail below.

Because the part of the character represented by the single-link module need not be radially symmetrical, this module also has a rotational position. The animation software can keep track of the rotational position of this single-link module with a directional vector that is perpendicular to the major axis of the module. In this way, the part of the character represented by the module can be turned by rotating this directional vector about the major axis. The selection radius 330, defined in screen space, is used during stroke processing (described in more detail below) to determine whether a stroke command is intended for that module. When a stroke begins or ends within the selection radius for a given single-link module, as projected into screen space, that module becomes a possible candidate for adjustment based on the stroke.

FIG. 4 illustrates a double-link module, which includes a base joint 410, a middle joint 420, a tip point 430, and selection radii 440 and 450 related to each of the base joint 410 and tip point 430. Because of their segmented structure, double-link modules are useful for representing arms and legs. In a double-link system for a character's arm, for example, the base joint 410, middle joint 420, and tip point 430 might correspond to the character's shoulder, elbow, and wrist, respectively. Once the base joint 410 and tip point 430 are fixed in three dimensions (or "world space"), the middle joint 420 is restricted to a single rotational degree of freedom. As with the single-link module, the selection radii 440 and 450 are used to determine whether a stroke command is intended for that module.

The second selection radius 450 on the double-link module allows for the case where the user draws a stroke that both begins and ends near the base/tip ends of the double-link module. In practice, for example, this may be useful for refining a pose for an arm or leg without affecting the attached hand or foot. Without the second selection radius 450, there could be ambiguity in that the system might not know whether to apply the stroke to the hand or the arm.

FIG. 5 illustrates a spine module. Spine modules comprise two single-link modules 510 and 520 and a series of connecting joints 530 that form a region of interpolation between the two single-link modules. Depending on the desired behavior of the spine module, the interpolation can be performed in various ways. In one embodiment, the connecting joints 530 are interpolated to be equally spaced along a curved line that preserves the continuity between the slopes of the two single-link modules 510 and 520. In one example, the single-link modules 510 and 520 represent the pelvis and chest of a character, in which case the interpolation joints represent the character's body. Spine modules may also be used to represent necks, tails, or any other areas where interpolation of a number of connecting joints is desired.

The character may further include one or more symbol recognition modules, which operate at a more abstract level than the geometric modules described above. Rather than pose an element according to an interpretation of the two-dimensional stroke in three-dimensional space, symbol recognition modules relate particular input strokes (or symbols) to various predefined operations that have an effect on the pose or appearance of the model. The user-defined operations can be implemented with software routines that perform the predefined operations. Each symbol recognition module thus includes a reference point (in the space of any joint), a selection radius for the reference point, and a list of symbols and their associated software routines. Accordingly, when the user inputs a stroke within the selection radius of the module's reference point, the posing system determines which symbol has been input, and the software routine associated with that symbol is performed.

These user-defined operations may include general-purpose procedures that are capable of a wide range of tasks. For example, a symbol recognition module relating to the face of a character may be used to select a particular facial expression from a list of facial expressions from a predefined library, or a symbol recognition module related to a hand of a character may be used to select from a list of hand poses from a library. Once selected, the expression, pose, or other predefined feature is then applied to the model directly. FIG. 6 illustrates an example of various symbols and how the symbol can be used to create a predefined hand pose or facial expression. This type of module can be very useful due to the various applications that it renders possible. For example, other possible uses for symbol recognition modules include selecting a complete pose for a character from a pose library (e.g., to use as a starting pose) or changing the dimensions, skin, hair style, wardrobe, or any other aspects of the character or model desired by the animator.

User Commands—Strokes

Figures 7A, 7B, 8:
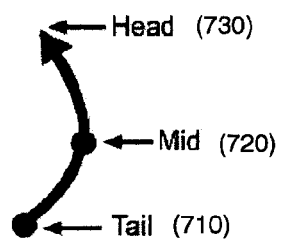
FIGS. 7A and B illustrate two different example strokes that a user can input into the posing system, in accordance with an embodiment of the invention.
FIG. 8 illustrates a relationship between the curvature of a stroke and its rotation angle, in accordance with an embodiment of the invention.

As described above, the posing system is based on strokes inputted by a user. FIGS. 7A and B illustrate two different example strokes that a user can input into the posing system using any type of direct manipulation input device, such as a graphics pen, mouse, joystick, or the like. The stroke shown in FIG. 7A includes a tail 710, a middle point 720, and a head 730. This stroke has a direction beginning at the tail 710 and ending at the head. The middle point 720 for the stroke can be determined according to various techniques. For example, the middle point 720 could be calculated by determining the geometric middle of the line segment defined by the path of the stroke. In another embodiment, the middle point 720 is determined by time-sampling the mouse positions as the stroke is entered, using the position at the temporal halfway point as the middle point 720. This latter method allows the artist more flexibility when inputting strokes and can lead to a more intuitive selection of a middle point.

In another aspect, the stroke can intersect with itself. FIG. 7B illustrates an example of a self-intersecting stroke, in which the user makes a loop in the stroke. Self-intersection serves to communicate additional information to the posing system and provides a natural and fluid means by which an additional degree of freedom can be specified. For strokes exhibiting self-intersection, the geometric center of the loop may be considered to be the middle point of the stroke; alternatively, the intersection point can be considered the middle point.

Because the stroke is used to position elements of the character, it is useful to quantify various features of the stroke. Preferably, the quantifiable features of a stroke used to pose elements are selected to be intuitive to an artist in that the graphical, two-dimensional aspects of the stroke can be readily learned to represent the desired three-dimensional positioning of the model. In one embodiment, the curvature of the stroke is used to indicate a rotation of an element about its major axis. As illustrated in FIG. 8, the rotation (θ) can be calculated from the ratio of the distance between the head and tail point (l) and the distance between the middle point and the head/tail average point (d). The calculated rotation is limited between ±90 degrees, and the rotation is in the same direction as the curvature (i.e., θ is a negative angle as defined in FIG. 8) of the stroke as drawn by the artist. For example, a right facing curve results in a position that is rotated from the center (i.e., facing towards or away from the camera) to the right, and a left facing curve results in a position rotated from the canter to the left, both from the vantage of the camera viewing in screen space.

In one embodiment, the stroke required to achieve a given rotational position is the same as the projection of a meridian of a sphere rotated by that amount from a straight-on view of that meridian. Accordingly, this rotation can be determined according to the equation:

$$\theta = \arcsin\left(\frac{2d}{l}\right),$$

where d≦l/2, or θ±90 degrees if d>l/2. In this way, the artist draws a stroke having a curvature that is about the same as a meridian of a sphere would appear to have, if rotated by the desired amount from a position of 0 degrees of rotation in the screen plane. For example, assume an initial position of 0 degrees, in which a meridian appears as a line segment (i.e., seen straight on from the front). To rotate the model 45 degrees to the right, the stroke would have the same curvature as the meridian once it was rotated by this amount and projected in the screen plane. To rotate 90 degrees, the stroke would have roughly the shape of a semicircle—i.e., the projection in screen space of the meridian after being rotated 90 degrees. Accordingly, the angular position of an element is a function of the degree of curvature of the stroke associated with the element, such that the greater the curvature of the stroke, the greater the rotation of the element. This rotation of course is not limited to the rotation relative the screen plane, but rather is applied to achieve a rotational position for an element about its major axis. This is an easy and intuitive way for imparting a rotation to an element's pose.

Figure 9:
FIG. 9 shows an example of how self-intersection can be used to determine whether the element is facing towards the camera or away from it, in accordance with an embodiment of the invention.

It can be appreciated that this method only allows an artist to specify the rotational placement of the element within a range of 180 degrees (90 degrees to either side); however, there may be two possible orientations for a given stroke curvature (one front-facing and one back-facing). This is intuitive, because for a given projection of a meridian of an object in two-dimensional space, there are two possible angular positions for that element—one facing toward the camera and one facing away. (An exception to this is where the element is facing directly sideways, where a 90-degree rotation from rear facing is the same position as a 90-degree rotation to the same side from front facing.) Therefore, the additional stroke feature of self-intersection is used to resolve this ambiguity between the two possible rotational positions of the element. In one embodiment, the convention is chosen so that a stroke with self-intersection indicates that the object is facing away from the camera, while no self-intersection indicates a front-facing object. This convention can be reversed, but it is preferably used in a consistent way throughout the posing system to promote an intuitive interface. FIG. 9 shows an example of how self-intersection can be used to resolve between two possible positions for a given curvature. It is shown that, for a given curvature, self-intersection allows an element to be posed in a position facing towards the camera (a) (without self-intersection) or the one facing away from it (b) (with self-intersection).

Figure 10:
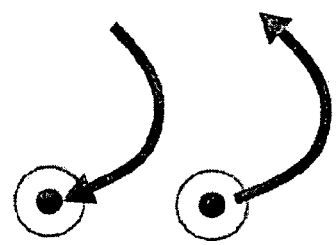
FIG. 10 illustrates an example of a stroke toward a selection node and another example of a stroke away from the selection node, in accordance with an embodiment of the invention.

The direction of the stroke can also be used to indicate whether an element is tilted into the camera view or away from it. For purposes of consistency and to promote an intuitive interface, the head of the stroke is considered to be closer to the camera than the tail; however, the opposite convention can be chosen. The direction of a stroke is defined relative to the selection node for an element. A stroke that has a head within the selection radius of a selection node is toward the node, and a stroke with a tail in the selection radius of a selection node is away from the node. FIG. 10 illustrates an example of a stroke toward a selection node and another stroke away from the selection node. Accordingly, when a stroke is input for an element into its selection node, the joint associated with the selection node is taken to be closer to the camera than a joint or tip associated with the tail of the stroke. The opposite is true for a stroke inputted that is drawn away from a selection node. A specific application of this rule is described below, but it can be appreciated that this convention leads to an intuitive interface for positioning elements that have a tilt relative to the viewing angle.

Drawn in two-dimensional screen space, each stroke preferably includes sufficient information to pose an element of the character in three-dimensional world space. Because each element of the character has a location and orientation in three-dimensional world space, determining the position of an element requires that the posing system resolve the many degrees of freedom for that element. For example, the simple single-link module has a three-dimensional coordinate position for each of its base joint and tip point and another degree of freedom for its rotation about its major axis. Accordingly, an inputted stroke preferably includes sufficient information to locate the coordinates of its base joint and tip point as well as determine the rotation of the module about its major axis. In one embodiment, therefore, a stroke may convey the following information:

location of head, tail, and middle point
    length of major axis (e.g., line segment between head and tail)
    curvature and direction of curvature of stroke
    whether the stroke is self-intersecting This information about each stroke can be used by the posing system to resolve the various degrees of freedom and position each element of the character, as described herein.

User Interaction: Posing
    Posing the Placement Module

The user may begin the posing process with a partially posed character located in a scene, or the user may have to place the character in the scene before posing it. To place a character in a scene, the user selects the character's placement module then makes a stroke that represents the arc of the reference points 230 for the character's placement module (see FIG. 2). Preferably, the software illustrates for the user the reference points 230 and their location on the character, giving the user a good indication of how to draw the stroke, e.g., where to begin or end the stroke, to achieve the desired character placement. Responsive to the stroke, the posing system places the character in the scene so that the reference points 230 of the character's placement module are moved based on the stroke's characteristics. The root node of the character is placed at an appropriate distance from the camera according to a default pose for the character, and all other elements of the character are thus placed according to the default pose and the placement of the root.

Figure 11:
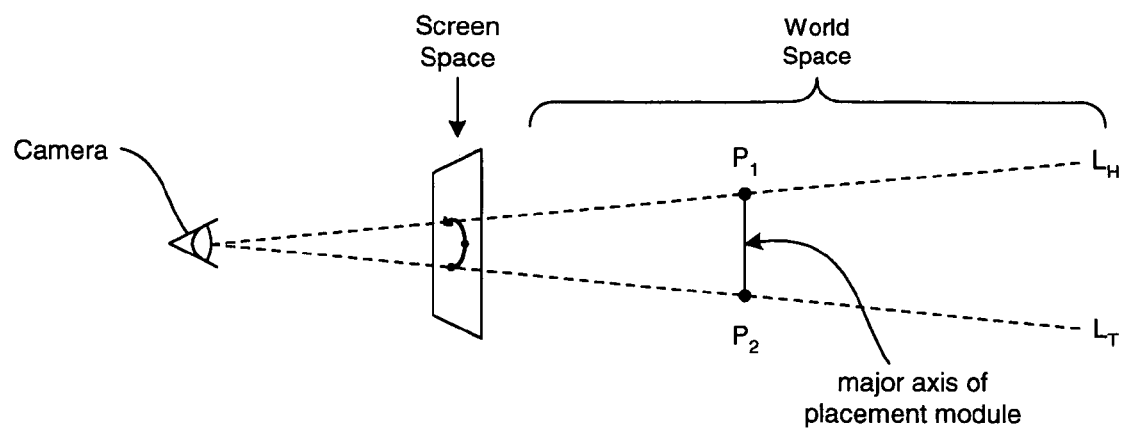
FIG. 11 illustrates the relationship between screen space and world space for posing a placement module, in accordance with an embodiment of the invention.

To determine the precise placement of the placement module in the three-dimensional coordinates of the screen, the system translates the stroke from screen space into directions for placement in three-dimensional world space. FIG. 11 illustrates how a stroke in screen space is used to place a placement module in world space. From the camera position, a line is projected through each of the head and tail of the inputted stroke in screen space. In one embodiment, a perspective camera is represented as a 4-by-4 matrix, which defines a relationship between points in world space and pixels in screen space. By inverting the camera matrix, two-dimensional points of the input stroke can be transformed into three-dimensional lines projected into world space.

With the lines $L_H$ and $L_T$ projected, the first and third reference points of the placement module are located somewhere on the lines projected through the head and tail. As described above, a line segment between the first and third reference points of the placement module define the major axis of the module. In one embodiment, the placement module is initially positioned so that the major axis is parallel to the screen. The placement module is further constrained because the size of the character, and thus the distance between the first and third reference points, is known. Therefore, the placement module is positioned so that its first and third reference points are located on the projected lines $L_H$ and $L_T$ where the distance between the lines equals the segment length.

Figure 12:
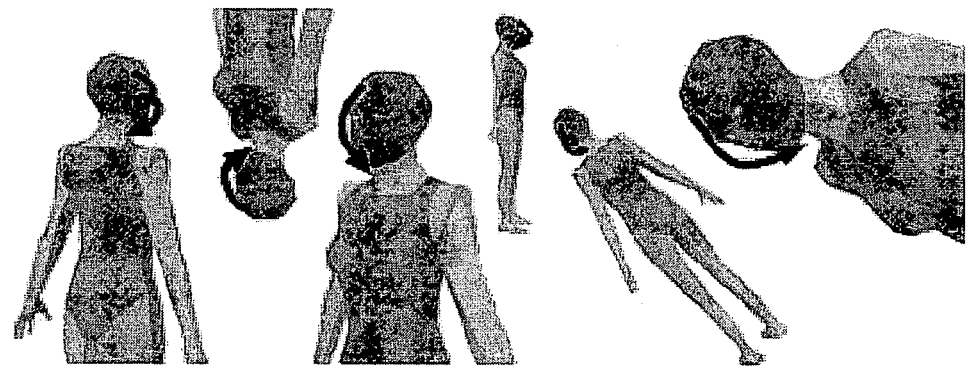
FIG. 12 illustrates the result of various strokes for a placement module of an example character.

The placement module has an orientation, which can be defined by its major axis and a rotation about that axis. Therefore, once the placement of the first and third reference points is done, the only degree of freedom for the module is the rotation about its major axis. Accordingly, a front-facing vector is defined for the placement module as the vector from the average of the first and third reference points to the second reference point. In the case of the placement module shown in FIG. 2, the front-facing vector extends outward from the front of the character's face. The angle of the placement module is determined by first calculating the rotation angle of the inputted stroke, as described above. If the stroke self-intersects, the placement module's front-facing vector is oriented to point directly away from the camera and then rotated an amount equal to the calculated rotation angle. If the stroke does not self-intersect, the placement module is oriented to point directly towards the camera and then rotated an amount equal to the calculated rotation angle. The degree of rotation in combination with whether the module is front-facing or rear-facing fully constrains the placement module, which can then be successfully posed. FIG. 12 illustrates the result of various strokes for a placement module of an example character.

Because the length of the stroke is used to determine distance from the camera, the major axis for the placement module is oriented so that it is parallel with the viewing plane. In some embodiments, therefore, it may not be possible to calculate foreshortened tilt of the placement module relative to the screen when posing this module. In practice, however, a desired tilt can be added after placement to refine the pose, for example by posing a neck or other element to produce a desired tilt.

Posing the Single-Link Modules

In one embodiment, posing a single-link module results in a rotation of the module about its base joint in up to three rotational degrees of freedom. When posing a single-link module, the coordinates of the base joint preferably do not change, although it can be rotated. This is because the base joint of the single-link module includes the selection radius (see FIG. 3), which is used to resolve whether an inputted stroke is intended for that single-link module. To move a base joint of a single-link module, therefore, a user would pose a parent element in the skeleton hierarchy. Alternatively, if the posing system can determine through another selection scheme that a stroke is intended for a particular single-link module, the stroke can cause the base joint of the single-link element to move as well.

Figure 13:
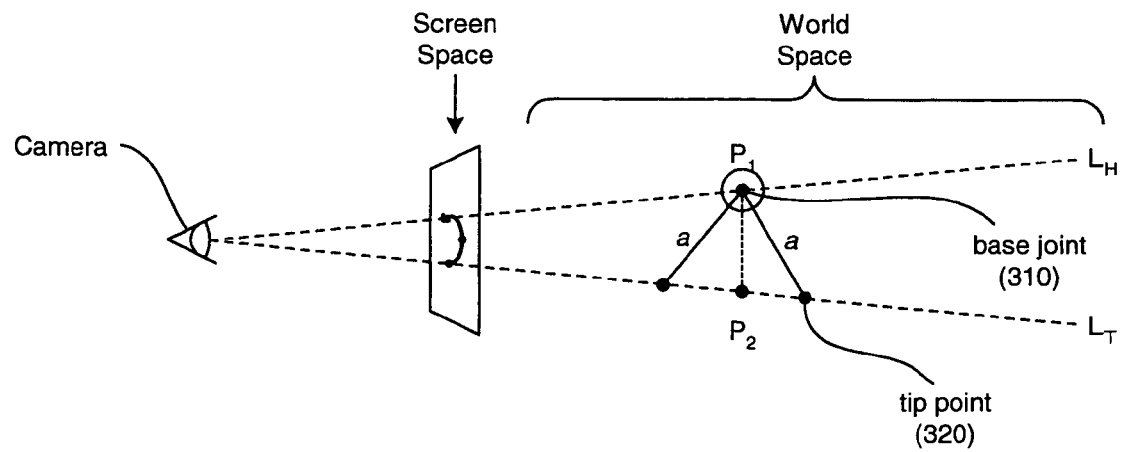
FIG. 13 illustrates the relationship between screen space and world space for posing a single-link module, in accordance with an embodiment of the invention.

For single-link modules, the imaginary line between the head and tail of an input stroke is considered to be the desired projection of the module's major axis in screen space. To pose a single-link module, the user draws a stroke that begins or ends within the selection radius of the module's base joint. This stroke determines the projection of the major axis in screen space. The head and tail of the drawn stroke are projected as lines $L_H$ and $L_T$ in world space, as described above. FIG. 13 illustrates the relationship between screen space and world space for posing a single-link module, in accordance with an embodiment of the invention.

Because the stroke begins or ends within the selection radius of the module's base joint, the base joint will lie on either line $L_H$ or $L_T$ in world space. Lines $L_H$ and $L_T$ are projections of the head and tail, respectively, into world space from the camera. In the example of FIG. 13, the stroke was drawn into the base joint, so the base joint will lie on line $L_H$. The coordinates of the base joint are also known, so its position ($P_1$) on the projected line is also known. Because the tip point of the module must lie on the other projected line, its location can be found according to the known segment length (a) of the module, which may be defined as the length of the module's major axis. Depending on the stroke, there may be zero, one, or two possibilities for the location of the tip point on the other projected line. How many solutions exist can be determined by finding the nearest point ($P_2$) on the other projected line. If the distance between $P_1$ and $P_2$ is equal to the segment length (a), there is only one solution, and the position of the tip point is $P_2$. If the distance between $P_1$ and $P_2$ is greater than the segment length (a), however, there are no solutions, assuming the single-link module is not allowed to stretch or otherwise deform. However, this zero-solution case may be treated like the one-solution case, where the tip point is taken to be on the line segment between $P_1$ and $P_2$ a distance of the segment length (a) away from $P_1$. In both the zero-solution and the one-solution cases, the inputted stroke will pose the single-link module in a position that is parallel to the screen (i.e., so it has no foreshortening tilt).

In a third scenario, the distance between $P_1$ and $P_2$ is less than the segment length (a), as shown in FIG. 13, so there are two possible locations along the projected line for the tip point. This ambiguity can be resolved using the direction of the stroke. As explained above, an embodiment of the invention uses the convention that the stroke's head is closer to the screen than the tail. In the example of FIG. 13, the stroke head corresponds to the base joint, and the tail corresponds to the tip point (i.e., the stroke was drawn into the base joint). Therefore, the base joint is closer to the screen, and the true location of the tip point—which must be farther from the screen—can be determined. It can be appreciated, therefore, that shorter strokes will tend to position an element with a greater amount of tilt relative to the screen space. This is intuitive, as the greater the tilt an element has with respect to the screen the shorter its projection thereon. FIG. 14 shows several poses, (a) through (f), with different amounts of foreshortened tilt that can be achieved for an example placement module (a face) using different strokes.

With the base joint and tip point located, the only degree of freedom for the single-link module is its rotation about its major axis. As described above, a front-facing axial plane or vector can be defined for both placement and single-link modules to define a "front" side of the module with respect to rotation about its major axis. For a typical humanoid character, natural candidates for this front-facing plane are the front of the face, chest, and pelvis; the top of the feet; and the backs of the hands. It is assumed in one embodiment that when a stroke is made, this plane should point toward the camera by default. However, a self-intersecting stroke indicates that the user wishes to orient the front-facing plane so that it is facing away from the camera. The rotation angle calculated by the curvature of the stroke, as described above, is then used to determine a rotation from the front or rear directions about the element's major axis. In this way, the single-link module is fully constrained and therefore can be successfully posed. FIG. 15 includes a table that shows how the curvature and self-intersection of a stroke, together, can be used to represent different amounts of axial rotation to determine the axial rotation position for a single-link element.

Posing the Double-Link Modules

As with the single-link modules, to pose a double-link module a user draws a stroke toward or away from the base joint of a double-link module. The system then orients the module (such as an arm or leg) so that it matches the stroke. As with the single-link module, the system projects the head and tail of the inputted stroke into world space and then locates the base joint and tip points on each projected line. Based on the direction of the stroke, the system determines whether each segment should tend toward or away from the camera. The base joint, middle joint, and tip point define the plane of the double-link module.

In one embodiment for posing a double-link module, the head, tail, and middle points of an inputted stroke are located in screen space. These three points are then projected into world space from the camera to form lines $L_H$, $L_T$, and $L_M$, respectively. The base joint and tip point of the double-link module are constrained to be located on one of the $L_H$ and $L_T$ lines (depending on which node corresponds to the head and tip of the stroke in screen space), and the middle joint is constrained to be on the projection of the stroke's middle point, line $L_M$. FIG. 16 illustrates the relationship between screen space and world space for posing a double-link module. In the example shown in FIG. 16, the base joint is constrained to be located on line $L_H$, and the tip point is constrained to be located on line $L_T$.

When posing a double-link module, the coordinates of the base joint do not change, although it can be rotated. To move the base joint, therefore, a user would pose a parent element in the skeleton hierarchy. The location of the base joint is thus already determined for the double-link module, as shown in FIG. 16. The algorithm used to turn a stroke into the transformations associated with a double-link module builds upon on the method described above for the single-link module. Specifically, the posing system next determines the two possible locations of the module's middle joint along line $L_M$. (For the zero and one-solution cases, the algorithm simplifies to the overly constrained case described above in connection with the single-link module.) This process is then repeated to find the two possible locations for the tip point along line $L_T$ for each of the possible middle joint locations. Accordingly, this process results in four different possible orientations of the double-link module in world space, where the tip point is located at one of $P_1$, $P_2$, $P_3$, or $P_4$, as shown in FIG. 16.

These four possible orientations are resolved using the direction of the stroke and whether the stroke self-intersects. As described above, the direction of the stroke indicates an approaching segment. Because the stroke ends at the base joint in the example shown in FIG. 16, the posing system knows that the base joint is closer to the screen than the middle joint. Therefore, candidate orientations $P_1$ and $P_2$ are eliminated. In addition, self-intersection of the stroke can be used to indicate whether the two segments of the double-link module should change their tilt direction relative to the screen. Because the stroke in FIG. 16 does not self-intersect, the module should not change direction. Therefore, orientation $P_3$ is eliminated, and $P_4$ is chosen as the correct user-desired pose for the module. In this way, the double-link module is fully constrained, and the element is successfully posed. The chart of FIG. 17 shows the different screen strokes that could be used to achieve each of the four possible positions corresponding to $P_1$, $P_2$, $P_3$, or $P_4$, as shown in FIG. 16.

Operation of the Posing Software

When a user enters a stroke, the posing system determines which element of the skeleton is to be posed using the stroke. Generally, the system assumes that the user intends to pose the element for which the inputted stroke begins or ends within the element's selection radius. To determine which element should be selected, the system first projects the selection node and selection radius for each element in the character's skeleton onto the screen space. Then, comparing the relative positions in screen space, the system identifies the selection node that is the closest to either the head or tail or the stroke entered. The element associated with that selection node is selected as the element to be posed.

In general it is desirable to keep mode-switching interaction to a minimum so that the flow of user interaction flow is minimally disrupted. However, since stroke processing is based on proximity to features that may overlap, it is possible for the system to process a stroke in a manner the user did not intend. This potential for confusion can be compounded as additional characters are added. There are several mechanisms for handling this issue, including: (a) allowing the enabling and disabling (or masking) of types of modules; (b) allowing selection of parts of characters to indicate specific modules be executed; and (c) including an undo operation.

Because placement-related strokes are not necessarily drawn over the top of a partially-posed character, placement requires the selection of a character. If a placement-enabled object (such as a face) is selected, the system recognizes it is in placement mode and acts accordingly. If nothing is selected, the system can be put in an "automatic" mode, where the module selection mask determines which modules are active.

Although the determination of which module to execute is generally based on stroke proximity, there may be exceptions to this rule. For example, related single-link and double-link modules can be confused. For example, a double-link module for an arm and the single-link module for its hand share the wrist as a common reference point. Confusion may occur when rotating the arm about the axis between the shoulder and wrist, where the system can rotate the hand instead of the arm. This confusion is avoided by giving priority to double-link objects where one end of the stroke falls within the selection radius of the base joint and the other falls within the selection radius of the tip node.

As explained above, symbol recognition modules relate input strokes made in proximity to reference points to user-defined operations. But these strokes may also be very similar to the strokes made for other types of modules. To avoid confusion among the modules, therefore, a user may pose the character with symbol recognition modules disabled (e.g., using a module mask), and then invert the module mask and interact with only the symbol recognition modules enabled.

As is now understood from the above, the present invention provides a stroke-based interface for using two-dimensional strokes to pose three-dimensional models. In addition to the various systems and methods described for representing and interpreting strokes, the invention also encompasses the stroke language itself, including the shape of the strokes, and the semantics of their interpretation and use. Another feature of the invention is the workflow or methodology used by an animator to pose a model using this stroke based posing system. This includes the process by which the animator would initially set up the pose of a model using the reference points, and then subsequently pose elements or portions of the model using the strokes. As mentioned, one feature of the invention is the association of user-defined operations with specific symbols; thus, another aspect of the invention is the stored data that represents the association of particular symbols or strokes with the operations.

A posing system described herein is designed to perform at least rough placement and posing of characters in a three-dimensional environment. Accordingly, the system provides a framework that can supplement rather than replace existing animation systems. In particular, the posing system is preferably compatible with other animation tools, which can be used for example to add refinement or minor adjustments to the posing achieved by a sketch-based method. Refinement may be handled by other interactive techniques within a larger framework and may include direct manipulation or inverse kinematics.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

I claim:

1. A method for posing a computer-animated three-dimensional model in a three-dimensional scene space, the model including a plurality of elements, the method comprising:
   receiving a stroke drawn in a two-dimensional screen space, the stroke having a starting point, an ending point, and a direction;
   associating the stroke with an element of the model; and
   positioning the element in the scene space based on the starting point, the ending point, and the direction of the stroke, wherein the element has a major axis of finite length that defines a position of the element in scene space, and positioning the element comprises:
      determining a set of candidate positions for which a projection of the major axis onto screen space is located on the screen space from the starting point to the ending point of the stroke; and
      selecting a candidate position from the set based at least in part on the direction of the stroke.

2. The method of claim 1, wherein the position of the element in scene space is further definable by an orientation about the major axis, and positioning the element further comprises:
   determining the orientation of the element based at least in part on the curvature of the stroke.

3. The method of claim 2, wherein positioning the element further comprises:
   determining the orientation of the element based at least in part on whether the stroke intersects itself.

4. A method for posing a computer-animated three-dimensional model in a three-dimensional scene space, the model including a plurality of elements, the method comprising:
   receiving a stroke drawn in a two-dimensional screen space, the stroke having a starting point, an ending point, and a direction;
   associating the stroke with an element of the model; and
   positioning the element in the scene space based on the starting point, the ending point, and the direction of the stroke, wherein
   a position of the element in scene space is definable by:
      a first link located between a base joint of the element and a middle joint of the element; and a second link located between the middle joint and a tip point of the element; and
   positioning the element comprises: determining a set of candidate positions for which a projection of the base joint onto screen space is located at the starting point or the ending point of the stroke, and a projection of the tip joint onto screen space is located at the starting point or the ending point of the stroke; and selecting a candidate position from the set based at least in part on the direction of the stroke.

5. The method of claim 4, wherein the direction of the stroke indicates whether the base joint of the selected position is closer to the screen space than the tip point of the selected position.

6. The method of claim 4, wherein the stroke has a middle point in screen space, and for each of the set of candidate positions, a projection of the middle joint onto screen space is located at the middle point of the stroke.

7. The method of claim 4, wherein selecting a candidate position is further based on whether the stroke intersects itself.

8. The method of claim 7, wherein whether the stroke intersects itself is used to determine whether the first and second links of the selected position change direction relative to the screen space.

9. A computer program product for posing a computer-animated three-dimensional model in a three-dimensional scene space, the model including a plurality of elements, the computer program product comprising a computer-readable medium containing computer program code for performing the operations:
   receiving a stroke drawn in a two-dimensional screen space, the stroke having a starting point, an ending point, and a direction;

associating the stroke with an element of the model; and positioning the element in the scene space based on the starting point, the ending point, and the direction of the stroke, wherein the element has a major axis of finite length that defines a position of the element in scene space, and positioning the element comprises:

determining a set of candidate positions for which a projection of the major axis onto screen space is located on the screen space from the starting point to the ending point of the stroke; and selecting a candidate position from the set based at least in part on the direction of the stroke.

10. The computer program product of claim 9, wherein the position of the element in scene space is further definable by an orientation about the major axis, and positioning the element further comprises:

determining the orientation of the element based at least in part on the curvature of the stroke.

11. The computer program product of claim 10, wherein positioning the element further comprises:

determining the orientation of the element based at least in part on whether the stroke intersects itself.

12. A computer program product for posing a computer-animated three-dimensional model in a three-dimensional scene space, the model including a plurality of elements, the computer program product comprising a computer-readable medium containing computer program code for performing the operations:

receiving a stroke drawn in a two-dimensional screen space, the stroke having a starting point, an ending point, and a direction;

associating the stroke with an element of the model; and positioning the element in the scene space based on the starting point, the ending point, and the direction of the stroke, wherein a position of the element in scene space is definable by: a first link located between a base joint of the element and a middle joint of the element; and a second link located between the middle joint and a tip point of the element; and positioning the element comprises: determining a set of candidate positions for which a projection of the base joint onto screen space is located at the starting point or the ending point of the stroke, and a projection of the tip joint onto screen space is located at the starting point or the ending point of the stroke; and selecting a candidate position from the set based at least in part on the direction of the stroke.

13. The computer program product of claim 12, wherein the direction of the stroke indicates whether the base joint of the selected position is closer to the screen space than the tip point of the selected position.

14. The computer program product of claim 12, wherein the stroke has a middle point in screen space, and for each of the set of candidate positions, a projection of the middle joint onto screen space is located at the middle point of the stroke.

15. The computer program product of claim 12, wherein selecting a candidate position is further based on whether the stroke intersects itself.

16. The computer program product of claim 15, wherein whether the stroke intersects itself is used to determine whether the first and second links of the selected position change direction relative to the screen space.

\* \* \* \* \*